United States Patent [19]

Scholz et al.

[11] Patent Number: 5,400,194
[45] Date of Patent: Mar. 21, 1995

[54] MAGNETIC-TAPE-CASSETTE APPARATUS IN WHICH THE MOTOR DRIVING THE REEL DRIVE IS USED TO DRIVE THE CASSETTE LOADING MECHANISM AND HEAD SUPPORT

[75] Inventors: Thomas Scholz, Winkels; Stefan Koch, Hartenrod-Bad-Endbach, both of Germany

[73] Assignee: U.S. Philips Corporation, New York, N.Y.

[21] Appl. No.: 109,290

[22] Filed: Aug. 19, 1993

[30] Foreign Application Priority Data

Sep. 5, 1992 [DE] Germany .................. 42 29 753.2

[51] Int. Cl.6 ................. G11B 5/008; G11B 25/06
[52] U.S. Cl. ............................ 360/96.5; 360/96.1
[58] Field of Search ............... 360/96.3, 96.5, 85, 360/94–95

[56] References Cited

U.S. PATENT DOCUMENTS

| 4,924,336 | 5/1990 | Klos-Hein et al. | 360/105 |
| 4,984,105 | 1/1991 | Hwang | 360/85 |
| 5,257,150 | 10/1993 | Kunze et al. | 360/96.3 |
| 5,331,484 | 7/1994 | Klos-Hein et al. | 360/96.5 |

FOREIGN PATENT DOCUMENTS 3838013  5/1989  Germany .................... G11B 25/06

*Primary Examiner*—John H. Wolff
*Attorney, Agent, or Firm*—Norman N. Spain

[57] ABSTRACT

The invention relates to a magnetic-tape-cassette apparatus comprising a motor which drives the reel discs via a reel-drive mechanism (5) and which also drives a longitudinally movable servo rod (9) actuating a head support (26), a switching member (18) and a loading mechanism (21) comprising a lift slide (22) and, coupled thereto, a cassette holder (23), which are movable, between an eject position and an upper play position, in which upper play position the cassette holder (23) can be moved into a lower play position, a loading drive (10) being provided by means of which the loading mechanism (21) is engageable and disengageable and which can be driven by parts (6) of the reel-drive mechanism (5), in which apparatus engagement and disengagement is effected by means of a control rod (14) carried by the servo rod (9), the loading drive (10) and the parts (6) of the reel-drive mechanism (5) driving the latter being in driving engagement with the lift slide (22) at the same side of the deck plate on which the loading mechanism is arranged., and the loading drive (10) being arranged on a pivotal lever (12) which is pivotable between a driving position and a disengaged position by the control rod (14).

3 Claims, 7 Drawing Sheets

MAGNETIC-TAPE-CASSETTE APPARATUS IN WHICH THE MOTOR DRIVING THE REEL DRIVE IS USED TO DRIVE THE CASSETTE LOADING MECHANISM AND HEAD SUPPORT

BACKGROUND OF THE INVENTION

The invention relates to a magnetic-tape-cassette apparatus comprising a motor which drives the reel discs via a reel-drive mechanism and which also drives a longitudinally movable servo rod actuating a head support, a switching member and a loading mechanism comprising a lift slide and, coupled thereto, a cassette holder, which are movable between an eject position and an upper play position, in which upper play position the cassette holder can be moved into a lower play position, a loading drive being provided by means of which the loading mechanism is engageable and disengageable and which can be driven by parts of the reel-drive mechanism.

Such a magnetic-tape-cassette apparatus is known from DE 37 19 890 C2 which corresponds to U.S. Pat. No. 4,924,336. A reversible motor, which drives the reel discs for the tape spools, also serves for moving a loading mechanism comprising a lift slide and a cassette holder guided therein. The motor transmits the movement to the lift slide via a servo rod. Moreover, it is known from EP 366 191 A2 which corresponds to U.S. Pat. No. 5,331,484 to arrange a control rod on the servo rod, which control rod is connected to a coupling rod. The servo rod, the control rod and the coupling rod influence the displacement of the lift slide along the path of movement of the servo rod.

The lift slide is moved via a coupling member which extends through a deck plate from one side to the other side. To make this possible the deck plate has a longitudinal slot. This slot limits the path of movement of the lift slide because the slot cannot be made arbitrarily long without the stability of the deck plate being affected. With this known apparatus it is therefore difficult to realize an extension of the cassette ejection path.

From DE 38 38 013 A1 which corresponds to U.S. Pat. No. 4,984,105 it is known to drive the loading mechanism by a motor which also drives the reel spindles for the magnetic-tape reels. During the loading operation the drive mechanism is switched from reel drive to loading drive. The drive mechanism is switched over by means of a pivotable actuating plate, which is actuated by a function plate. The problem of extending the ejection path does not exist here because video cassettes have substantially larger dimensions than audio Compact Cassettes and are therefore ejected far enough.

SUMMARY OF THE INVENTION

It is an object of the invention to extend the path of movement of the lift slide, for example to ensure that a cassette projects further from the apparatus in the eject position, without the deck plate being weakened and so as to obtain more free space at the head side of the deck.

According to the invention this object is achieved in that engagement and disengagement is effected by means of a control rod carded by the servo rod, the loading drive and the parts of the reel-drive mechanism driving the latter being in driving engagement with the lift slide at the same side of the deck plate on which the loading mechanism is arranged, and the loading drive being arranged on a pivotal lever which is pivotable between a driving position and a disengaged position by the control rod.

Since the drive of the lift slide no longer extends through the deck plate and the slot is therefore omitted the path of movement of the lift slide is limited only by the external dimensions of the deck plate itself.

In a further embodiment of the invention during the movement of the servo rod in the loading direction the control rod is can be moved along over a part of the path of movement until a stop limits the movement of the control rod in such a manner that from a position on the servo rod dictated by the stop a control cam of the pivotal lever has to run onto a profile surface of the control rod which urges the pivotal lever into the disengaged position. This ensures that the loading drive is not disengaged before the loading mechanism has reached its play end position and remains disengaged until it is to be actuated in order to exchange a cassette.

In a further embodiment of the invention there is provided a latching lever which, in order to control the switching member, can be actuated by the cassette holder in such a manner that during inward movements it brings the switching member into engagement with the servo rod until the servo rod itself holds the switching member in the engaged position. During the movements of the servo rod the latching lever then ensures, independently of the servo rod movements, that the servo rod can perform its functions without being disengaged from its drive.

BRIEF DESCRIPTION OF THE DRAWINGS

The invention will now be described in more detail with reference to the drawings. The parts of the magnetic-tape-cassette apparatus which are relevant for a correct understanding are shown in different functional positions. In the drawings.

DETAILED DESCRIPTION OF THE PREFERRED EMBODIMENTS

Figure 1:
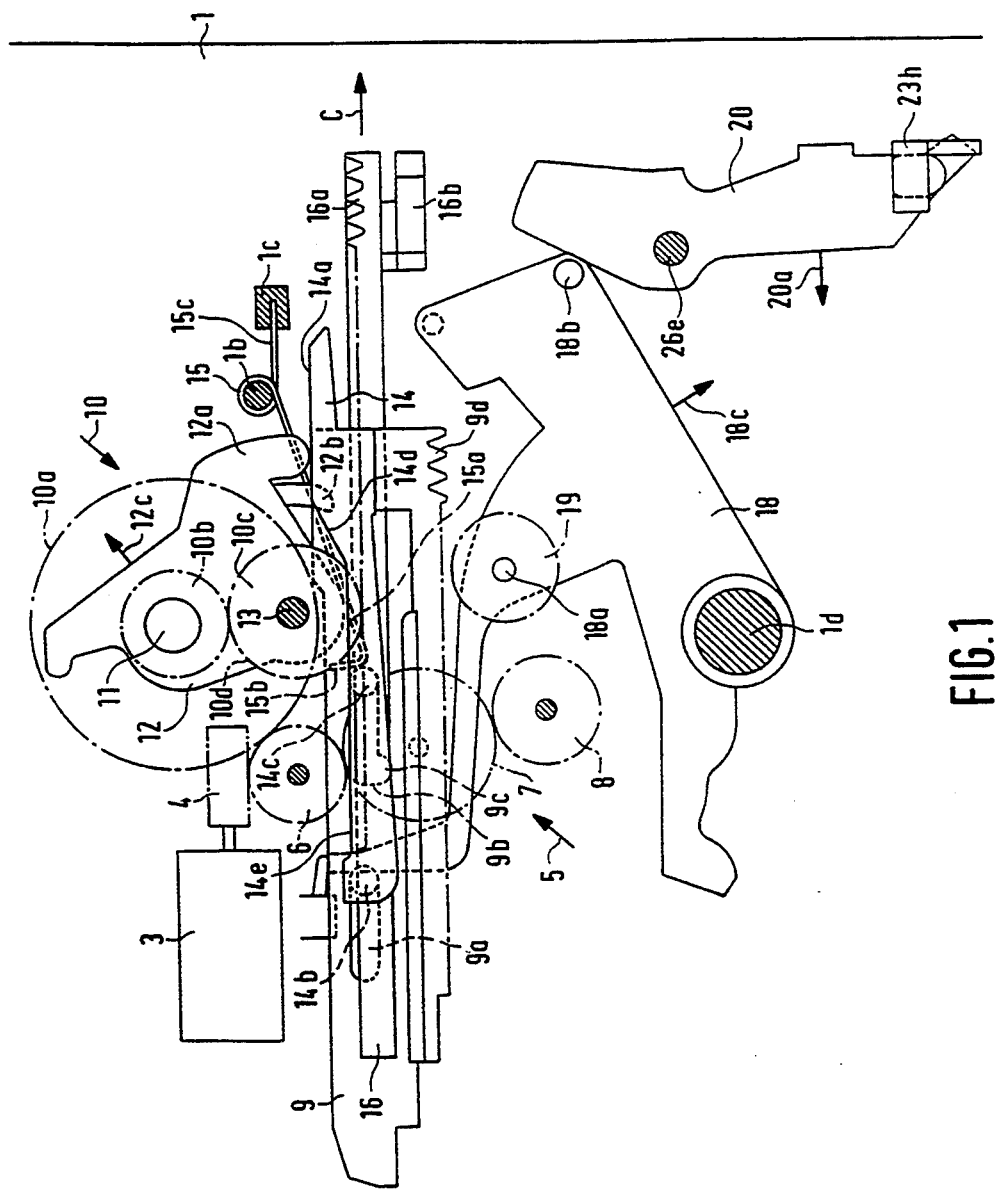
FIG. 1 shows the actuating mechanism of a magnetic-tape-cassette apparatus for moving the loading mechanism for magnetic-tape cassettes and for positioning the head support of the deck of the apparatus in the eject position.

As is shown in FIG. 1 the deck of a magnetic-tape-cassette apparatus is mounted on a deck plate 1. The deck plate 1 carries a winding motor 3, which drives a reel-drive mechanism 5 via a worm wheel 4, which reel-drive mechanism comprises a reduction gear wheel 6, a central gear wheel 7 and a transmission gear wheel 8. The reel-drive mechanism 5 is in operation as along as the winding motor 3 rotates.

A servo rod 9 is arranged on the deck plate 1, in a manner not shown, so as to be longitudinally movable.

A loading drive 10 comprises three gear wheels, i.e. a transport wheel 10a, an intermediate wheel 10b and a lift wheel 10c. The transport wheel 10a and the intermediate wheel 10b are rigidly coupled to one another and are journalled on a spindle 11 of a pivotal lever 12. The pivotal lever 12 itself is pivotable about a spindle 13, about which the lift wheel 10c is also rotatable. The pivotal lever 12 is springloaded in the direction indicated by an arrow 12c. The pivotal lever 12 has a control cam 12a adapted to follow a control profile 14a of a control rod 14. In order to preclude lateral tilting and, consequently, loss of contact between the control cam 12a and the control rod 14 the pivotal lever comprises an auxiliary limb 12b which presses laterally against the control rod 14. The control rod 14 is movably arranged on the servo rod 9. For this purpose the servo rod 9 has two guide slots 9a, 9b in which guide pins 14b and 14c are movable. The guide slot 9b has an L-shaped section 9c, in which the guide pin 14c is engageable as will be described hereinafter. A stop spring 15 cooperates with the guide pin 14c and has a spring hook 15b at a spring arm 15a. The stop spring 15 is mounted on a pin 1b of the deck plate 1 and with another spring arm 15c it bears against an abutment 1c.

The control profile 14a of the control rod 14 has an inclined surface 14d as a transition to a deeper situated profile surface 14e. The reduction gear wheel 6 and the transport wheel 10a are not in mesh as long: as the control cam 12a follows the control profile 14a.

The lift wheel 10c cooperates with a toothed-rack slide 16 which is movable in the longitudinal direction of the servo rod 9 and whose teeth 16a mesh with the teeth 10d of the lift wheel 10c. The toothed-rack slide 16 has an inclined surface 16b, which is clearly visible in FIG. 2 and which cooperates with an inclined actuating projection 23h of a cassette holder 23. The inclination of the inclined surface 16b corresponds to the inclination of a lift slot 22b and a guide rail 22c of a lift slide 22.

A switching member 18 is pivotable about a spindle 1d which is fixedly connected to the deck plate. The switching member 18 carries on a spindle 18a a switching wheel 19 which cooperates with a toothed rack 9d of the servo rod 9. A spring, not shown, urges the switching member 18 in the direction indicated by an arrow 18c.

A latching lever 20 cooperates with an actuating pin 18b. The actuating projection 23h of the cassette holder 23 can pivot the latching lever 20 about a pin 26e on a head support 26 depending on the position of the lift slide 22.

Figure 2:
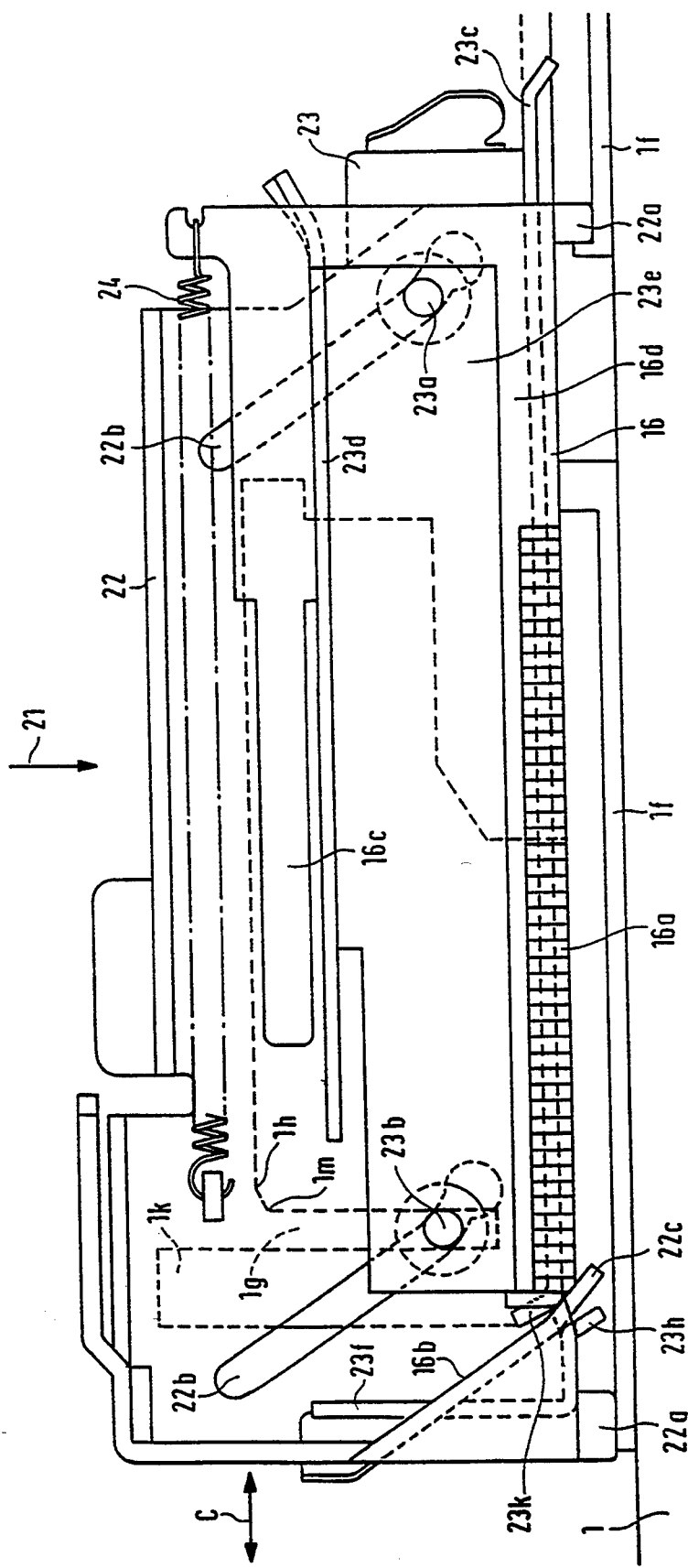
FIG. 2 is a side view of the loading mechanism of the deck of the apparatus, viewed from the side of a toothed-rack slide which is actuated by a loading drive.

FIG. 2 is a side view of the loading mechanism 21 of the deck. A lift slide 22 is guided in guide rails if of the deck plate 1 with feet 22a so as to be movable in the direction of the servo rod 9. The lift slide 22 has lift slots 22b which are inclined relative to the direction of movement indicated by an arrow C. These lift slots are engaged by pins 23a and 23b of the cassette holder 23. The pin 23b also engages a lowering slot 1g formed between a guide wall 1h and a bounding wall 1k.

The cassette holder 23 comprises a spaced-apart lower guide plate 23c and an upper guide plate 23d, which are interconnected by a vertical connecting wall 23a, which is situated at the rear in the drawing and which carries the pins 23a and 23b. The cassette holder 23 also has a rear wall 23f against which a cassette inserted by hand can abut.

The cassette holder 23 has two actuating projections, i.e. an actuating projection 23h, which is also shown in FIG. 1, and an actuating projection 23k, between which projections the guide rail 22c of the lift slide 22 is guided. Relative to the direction of insertion the rail 22c has an inclination corresponding to that of the lift slot 22b.

The toothed-rack slide 16 is arranged on the lift slide 22 so as to be movable in the direction indicated by the arrow C. As is shown in the drawing the toothed-rack slide, which is of a U-type construction with two limbs 16c and 16d extending in the direction of movement C, carries on its lower limb 16d the toothed rack 16a, which cooperates with the lift wheel 10c. The toothed-rack slide 16 also has the inclined surface 16b shown in FIG. 1, which cooperates with the actuating projection 23h of the cassette holder 23.

The toothed-rack slide 16 is coupled to the lift slide 22 by means of a spring 24.

In the situation shown in FIG. 1 the actuating mechanism is in the eject position. The control cam 12a is then pressed against the control profile 14a, and the reduction wheel 6 is in mesh with the transport wheel 10a. The latching lever 20 is in contact with the actuating pin 18b but exerts on this pin only a gentle force of a spring, not shown, because it is not actuated by the actuating projection 23h. The switching member 18 is disengaged from the transmission wheel 8, so that there is no contact between the toothed rack 9d and the drive. However, the toothed rack 16a of the toothed-rack slide 16 is in mesh with the lift wheel 10c, so that it can be moved when the motor 3 rotates.

Figure 3:
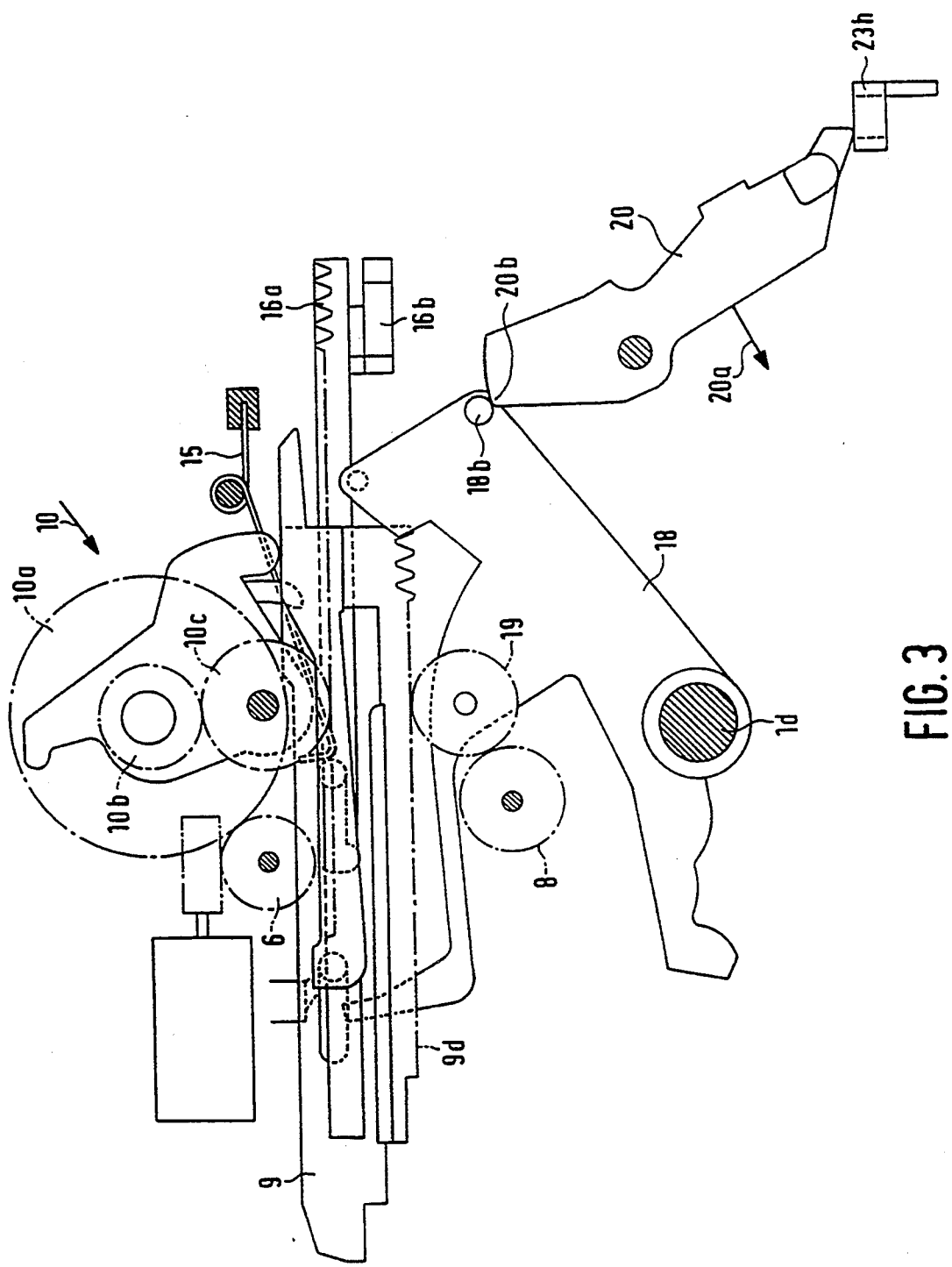
FIG. 3 shows the actuating mechanism of FIG. 1 in a position in which the loading drive and the cassette holder have brought a control rod for head support actuation into engagement with the drive.

When the winding motor 3 is started the lift wheel 10c will move the toothed rack 16a of the toothed-rack slide 16 to the fight in the direction indicated by the arrow 23. The spring 24 of the toothed-rack slide 16 is dimensioned in such a way that it actuates the lift slide 22 and the latter, in its turn, actuates the cassette holder 23. Thus, the toothed-rack slide 16 and the actuating projection 23h are moved to the right in the drawing. Now the actuating projection 23h, as is shown in FIG. 3, presses the latching lever 20 aside against a pre-load indicated by an arrow 20a, and the latching lever 20 is pivoted anti-clockwise. The latching lever 20 abuts against the switching member 18 with an actuating edge 20b and also pivots this lever anticlockwise against the spring bias 18c. The switching wheel 19 and the transmission wheel 8 then mesh with one another and the transmission wheel 8 moves the toothed rack 9d via pressure-roller bracket the switching wheel 19. The loading drive 10 is now in mesh.

As the movement of the servo rod 9 proceeds, the guide pin 14 being held by the spring hook 15b of the spring 15, the guide pins 14b and 14c move to the left in the guide slots 9a and 9b until finally the guide pin 14c engages the L-shaped section 9c. The control rod 14 is then pivoted clockwise and the control cam 12a is released by the control profile 14a. This is clearly illustratext in FIG. 4. Since it is spring-biassed in the direction indicated by an arrow 12c the pivotal lever 12 can now withdraw the transport wheel 10a from the reduction wheel 6. The pivotal movement of the pivotal lever 12 is limited by an edge 16f of the toothed-rack slide 16, against which edge an auxiliary limb 12b abuts. As a result, the loading drive 10 stops. The switching member 18 is now loaded in the clockwise direction by the latching lever 20 and the transmission wheel 8 can move the toothed rack 9d via the switching wheel 19. An eject spring, whose action is indicated by an arrow 30 in FIG. 2, acts upon the toothed-rack slide 16 and hence upon the lift slide 22. The eject spring ensures that after disengagement of the loading drive 10 the toothed-rack slide 16, the lift slide 22 and, consequently, the cassette holder 23 are held in the play position.

Figure 4:
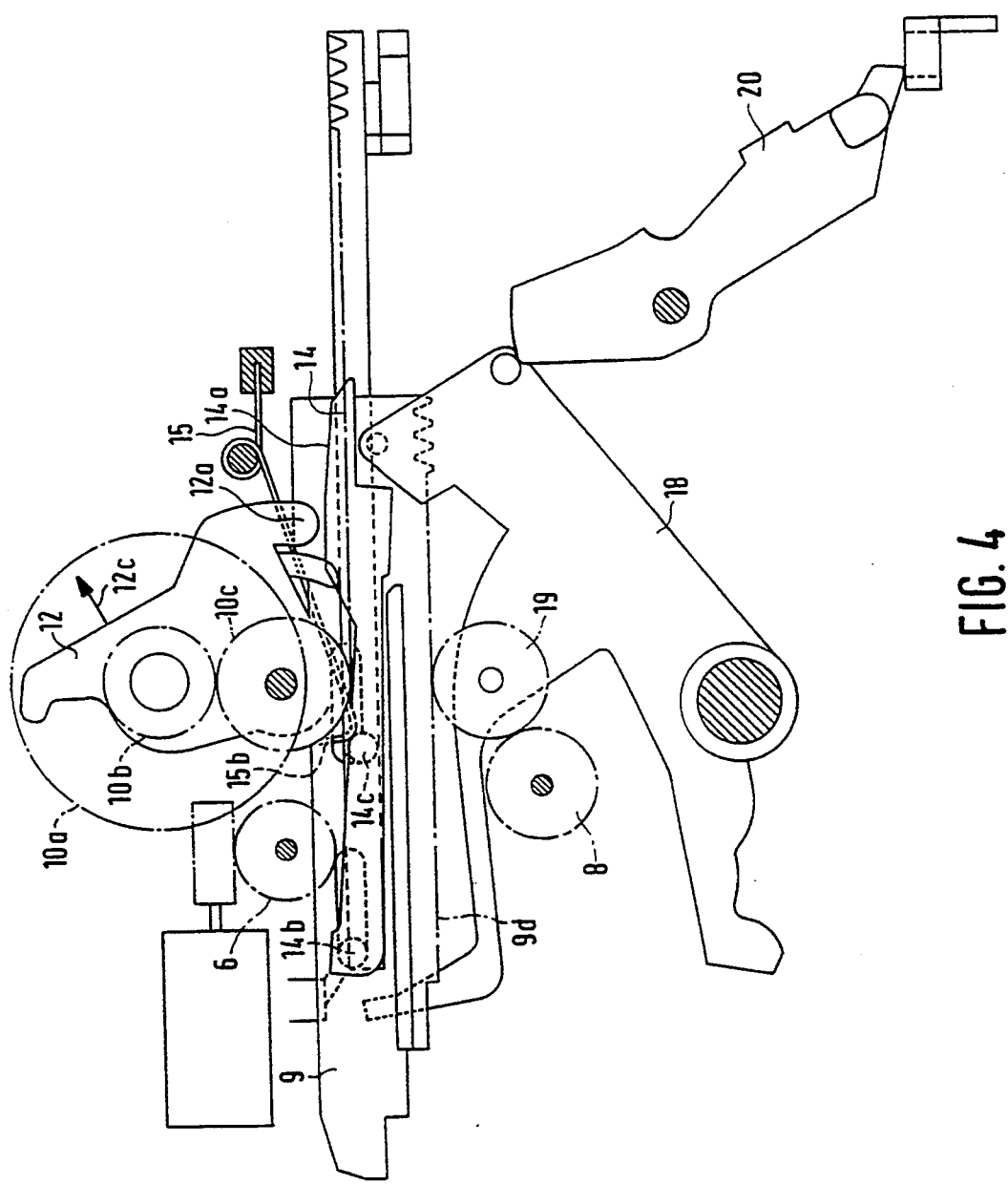
FIG. 4 shows a position of the actuating mechanism in which the loading mechanism has been set to the play position.
Figure 7:
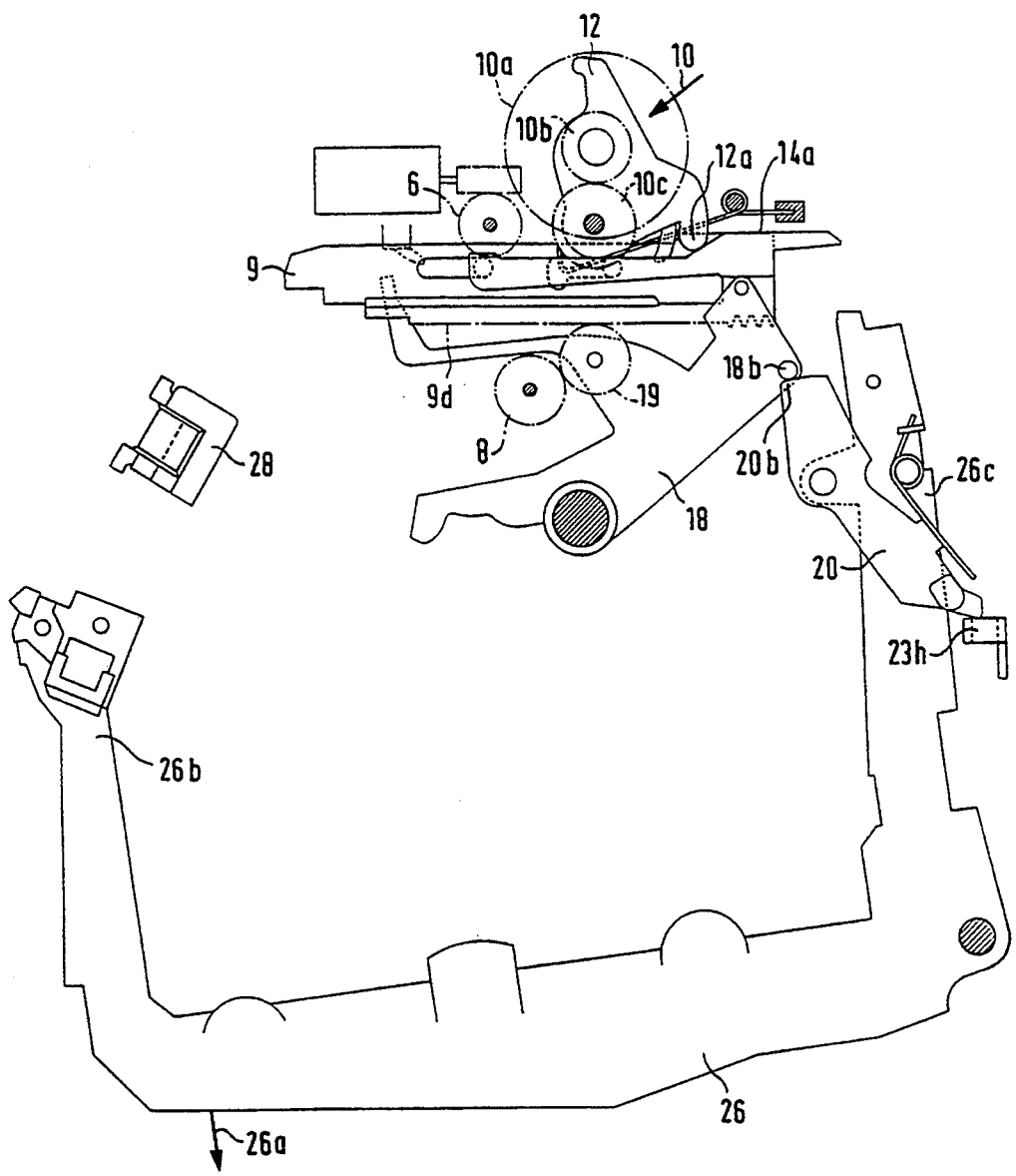
FIG. 7 shows a position of the actuating mechanism in which the head support has pivoted back into a standby position and the decision is taken whether the deck should be reset to the play mode or should be set to the eject mode.

Before disengagement of the loading drive 10 the cassette holder 23 is lowered from an upper position, not shown in FIG. 2, into the lower position shown in FIG. 7. Responsible for this are the guide rail 22c, which has moved the actuating projections 23h and 23k downward, and the lift slots 22b and the guide pins 23a and 23b in conjunction with the abutment 1c. When the position shown in FIG. 4 is reached the cassette holder is in a lowered play position and the loading process has been completed. The loading drive is now disengaged, as described.

The stop 15b of the stop spring 15 has ensured that the guide pins 14b and 14c on the servo rod 9 have moved to the left until the stop spring 15 has urged the guide pin 14c into the L-shaped section 9c of the guide slot 9b.

Figure 5:
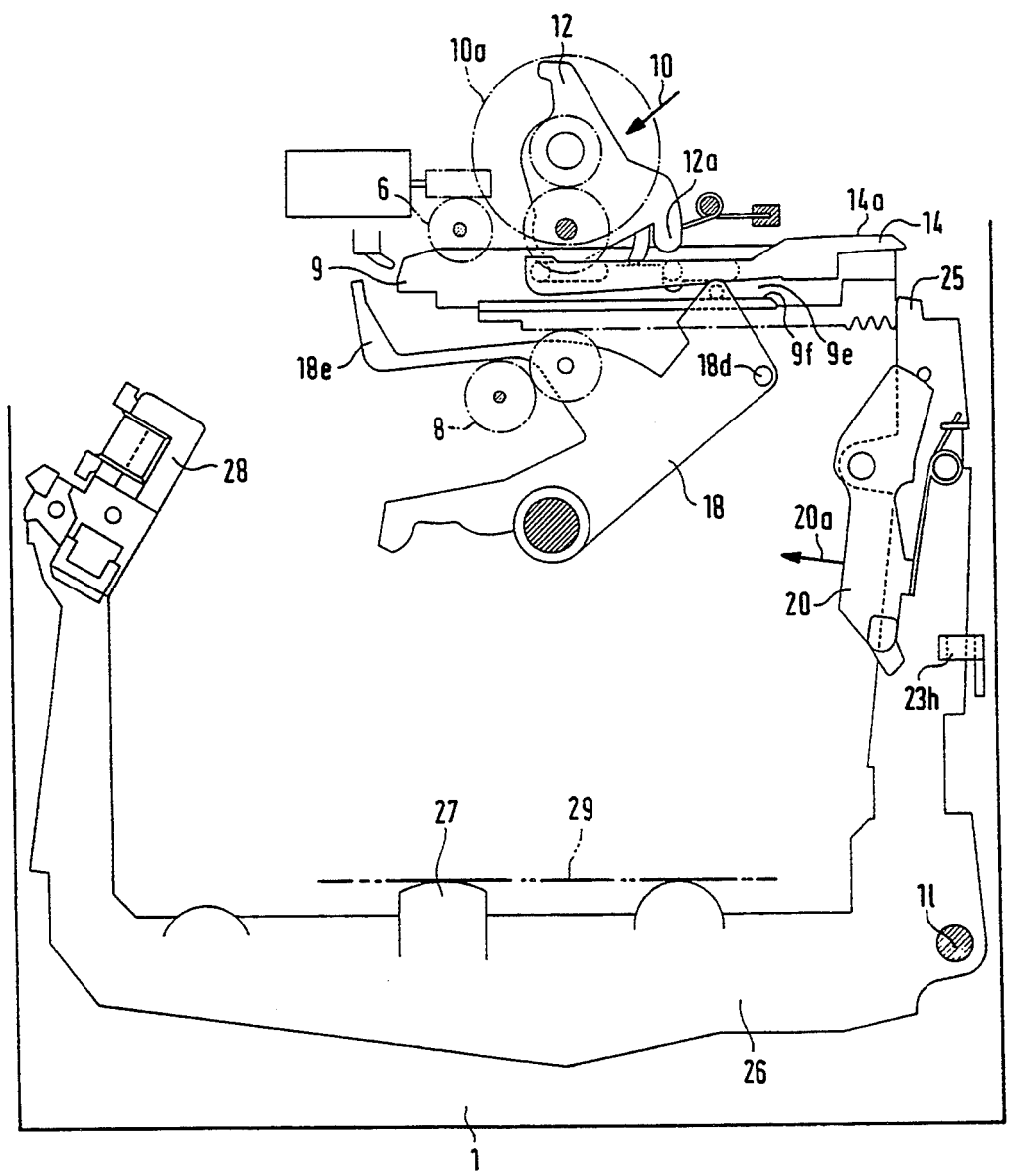
FIG. 5 shows a position of the actuating mechanism in which the head support has been set to its play position by the control rod.

The deck is not yet in the play mode when the cassette holder 23 has been moved into the lower play position. For this purpose the servo rod should be moved further to the right in the drawing. More details about this movement and the mechanisms involved are given in DE 37 19 890 C1, FIG. 5 (PHD 87-101, herewith incorporated by reference). The servo rod 9 thus moves further to the right and abuts against a stop 25 of a head support 26 which is pivotable about a pivot 11 on the deck plate 1. As a result of the servo rod 9 abutting against the stop 25 the head support is set to its play position, in which the magnetic head 27 comes into contact with the magnetic tape. In accordance with the method of operation set forth in DE 37 19 890 C1 a holding magnet 28 is activated at the instant at which the head support 26 has reached the position shown in FIG. 1 and holds the head support 26 in this play position. The servo rod 9 has now performed its function and, after the direction of rotation of the motor 3 has been reversed, is moves again to the right, driven by the transmission wheel 8. The loading drive 10 subsequently remains disengaged because the control cam 12a is not in contact with the control profile 14a, i.e. the profile surface 14e.

Although the servo rod 9 now moves to the left and is disengaged from the stop 25 of the head support 26 the head support remains in the play position owing to the holding force exerted by the holding magnet 28. The actuating edge 20b has also left the actuating pin 18b of the switching member 18 because the head support 26 has been pivoted into the play position.

Figure 6:
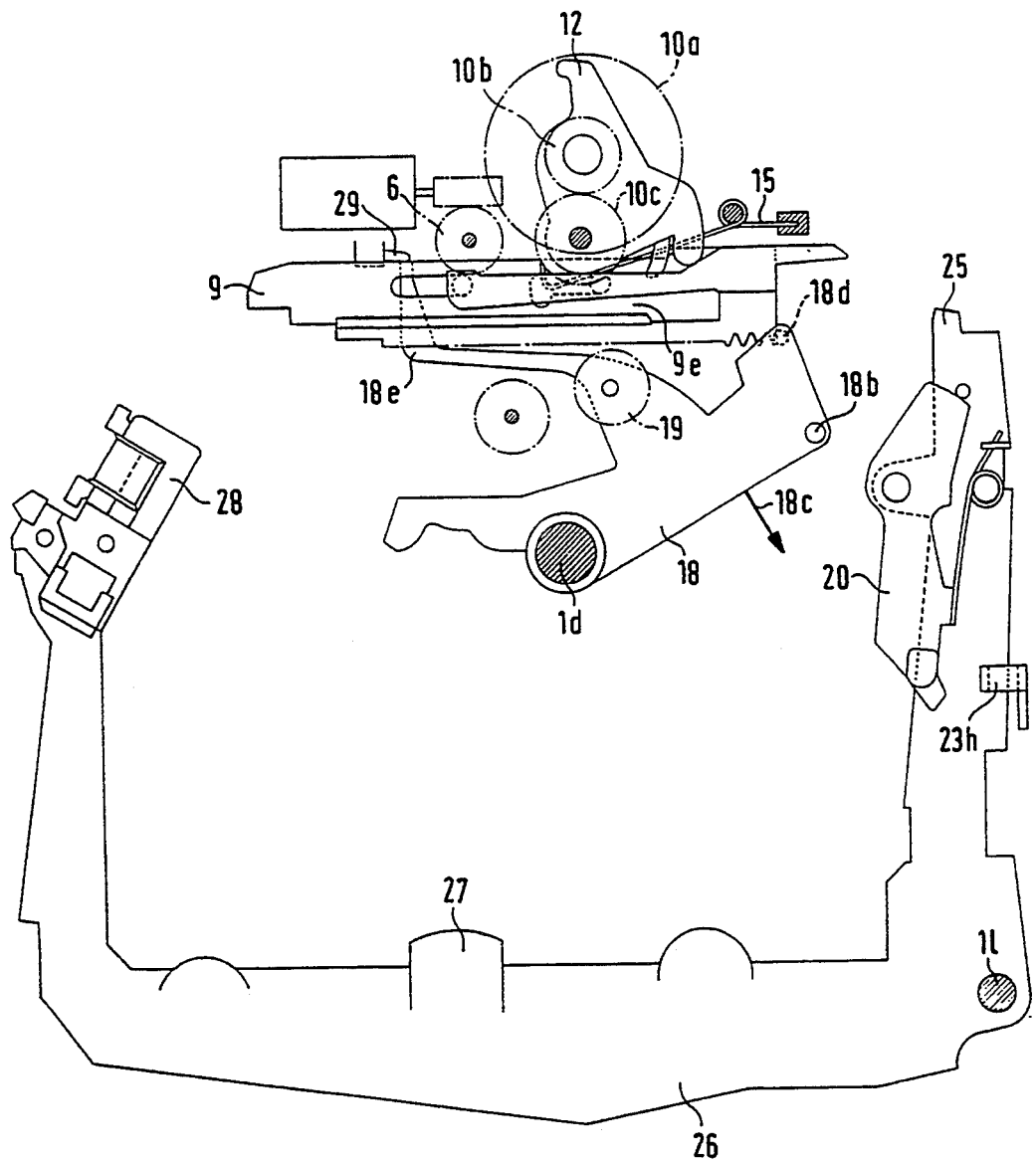
FIG. 6 shows a position of the actuating mechanism in which the control rod has moved back after the head support has been locked in the play position and the drive of the deck is disengaged from the control rod.

However, the switching member cannot pivot back in the clockwise direction because a pin 18d has engaged a slot 9e in the servo rod 9 and is retained by a retaining edge 9f. As the servo rod 9 returns to the left the pin 18d is disengaged from the slot 9e so that after the return movement as shown in FIG. 6 the switching member can pivot clockwise in the direction of the spring bias 18c, the transmission wheel 8 being disengaged from the switching wheel 19. Now the drive of the servo rod also ceases. A switching arm 18e has struck against a switch actuator 29 of a central switch and now sets the deck to the play mode.

FIG. 7 shows the deck in the standby position. In this position the holding magnet 28 is deactivated and a spring acting in a direction indicated by an arrow 26a causes the head support 26 to be pivoted anti-clockwise. The holding magnet 28 and an arm 26b of the head support have moved apart. As a result of the pivotal movement of the head support the latching lever 20 moves against the actuating pin 18b with its edge 20b. This causes the switching member 18 to pivot so far anti-clockwise that the transmission wheel 8 meshes again with the teeth 9d of the servo rod 9 via the switching wheel 19. If the deck is to be set to the eject position the servo rod 9 moves to the left, the control cam 12a engaging with the control profile 14a. The pivotal lever 12 is now pivoted anti-clockwise and the reduction wheel 6 meshes with the transport wheel 10a. The loading drive 10 is self-engaging and brings itself rapidly into full engagement as soon as the teeth begin to mesh. As a result, the winding motor 3 sets the loading mechanism 21 shown in FIG. 2 to the eject position. In the eject position (FIG. 1) the actuating projection 23h has again left the latching lever 20 so that the switching member 18 has been released and has pivoted clockwise, the transmission wheel 8 and the switching wheel 19 being out of mesh.

During the change-over to the eject position the guide pins 23a and 23b have moved upward in the slots 22b, the pin 23b having simultaneously moved upward in the lowering slot 1g. As long as the lift slide 22 moves to the left towards the eject position and the cassette holder 23 is merely lifted the toothed-rack slide presses with its edge 16b against the actuating projection 23h of the cassette holder 23. As long as the guide pin 23b moves upward in the slot 1g the lift slide 22 moves to the left in synchronism with the toothed-rack slide 16 because the toothed-rack slide 16 is retained by the actuating projection 23h. The spring 24 is not tensioned even in the case of a larger force between the lift slide 22 and the toothed-rack slide 16 because the movements of the lift slide 22 and the toothed-rack slide 16 are positively interlocked during this time. When the guide pin 23b moves around a corner 1m the holder 23 will move the lift slide 22 into the eject position.

We claim:

1. A magnetic-tape-cassette apparatus comprising a motor which drives the a reel-drive mechanism and which also drives a longitudinally movable servo rod actuating a head support, a switching member and a loading mechanism comprising a lift slide and, coupled thereto, a cassette holder, which are movable between an eject position and an upper play position, in which upper play position the cassette holder is moveable into a lower play position, a loading drive being provided by means of which the loading mechanism is engageable and disengageable and which can be driven by the reel-drive mechanism wherein the improvement comprises that engagement and disengagement of the loading mechanism is effected by means of a control rod carried by the servo rod, the loading drive and the portion of the reel-drive mechanism driving the loading drive being in driving engagement with the lift slide and being disposed on the same side of the deck plate on which the loading mechanism is arranged, and the loading drive is arranged on a pivotal lever which is pivotable between a driving position and a disengaged position by means of the control rod.

2. A magnetic-tape-cassette apparatus as claimed in claim 1, wherein during the movement of the servo rod in the loading direction the control rod is moved along over a part of the path of movement until a stop limits the movement of the control rod in such a manner that from a position on the servo rod dictated by the stop a control cam of the pivotal lever is run onto a profile surface of the control rod which urges the pivotal lever into the disengaged position.

3. A magnetic-tape-cassette apparatus as claimed in claim 1, wherein there is provided a latching lever which to control the switching member, is actuated by the cassette holder in so that during inward movement the latching lever moves the switching member into engagement with the servo rod until the servo rod itself holds the switching member in the engaged position.

* * * * *